(No Model.) 3 Sheets—Sheet 1.
S. J. E. JÖRGENSEN.
COMBINED WATER TANK AND LIFE BOAT.
No. 384,579. Patented June 12, 1888.
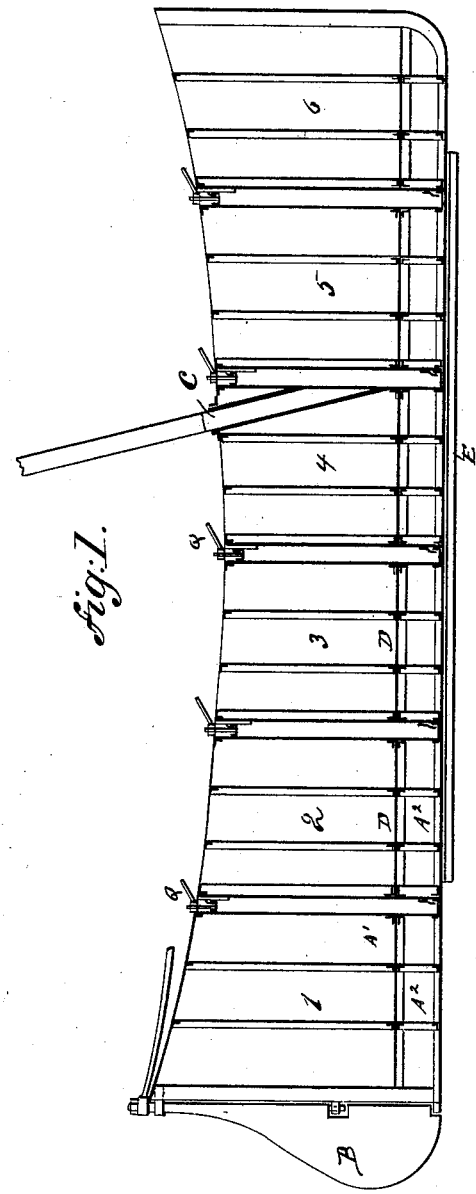
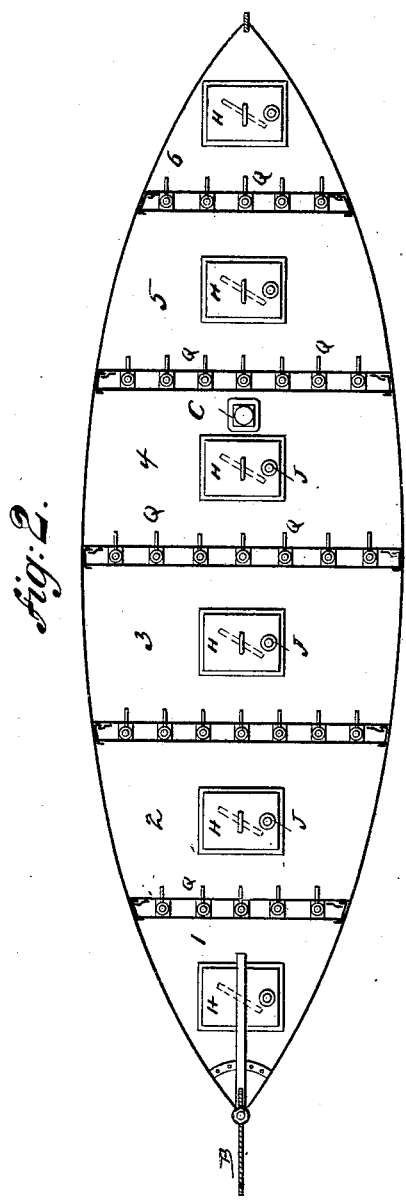
WITNESSES:
A. Schehl.
Carl Karp.
INVENTOR,
Simon J. E. Jörgensen
BY
Jones & Raigner
ATTORNEYS.

(No Model.) 3 Sheets—Sheet 2.
S. J. E. JÖRGENSEN.
COMBINED WATER TANK AND LIFE BOAT.
No. 384,579. Patented June 12, 1888.
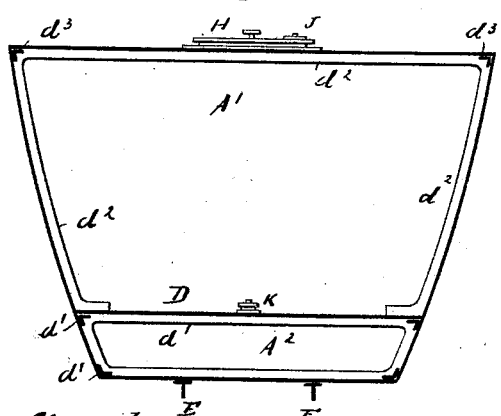
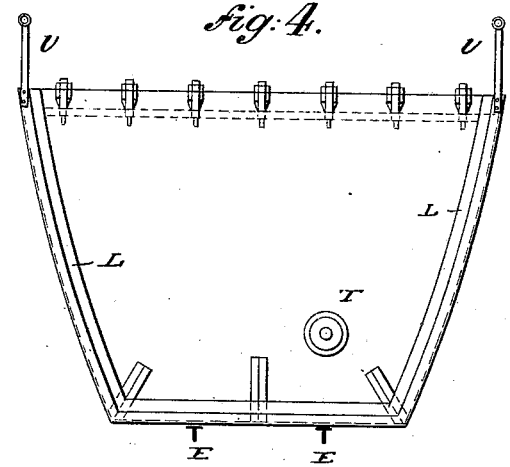
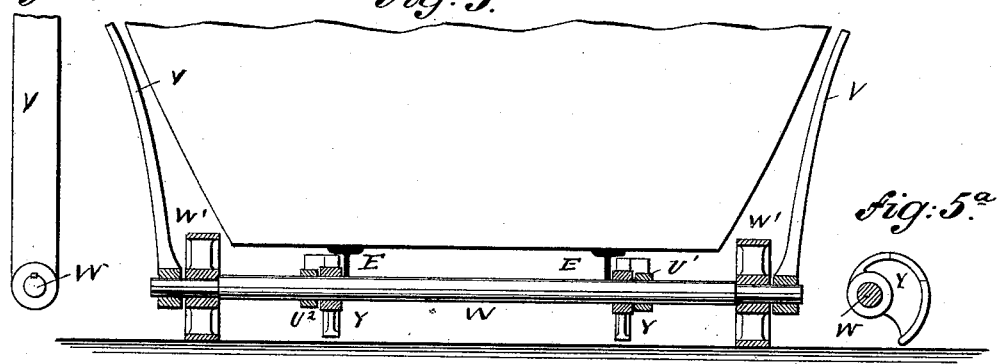
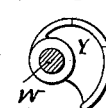
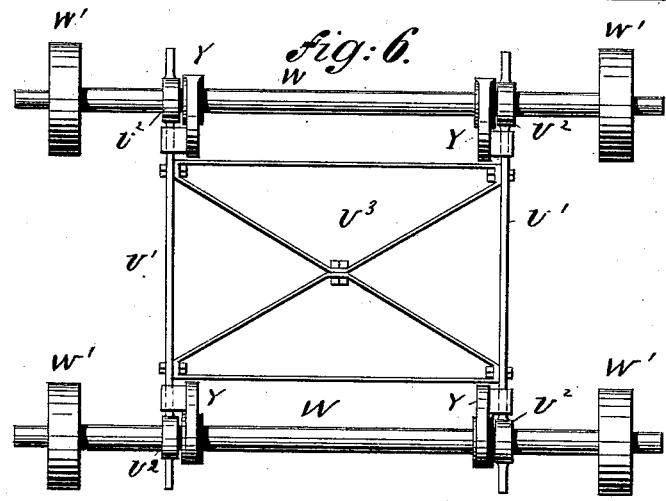
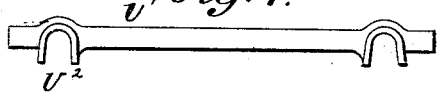
WITNESSES:
A. Schehl.
Carl Hays
INVENTOR,
Simon J. E. Jörgensen
BY
Jacque & Raegener
ATTORNEYS.

(No Model.) 3 Sheets—Sheet 3.
S. J. E. JÖRGENSEN.
COMBINED WATER TANK AND LIFE BOAT.
No. 384,579. Patented June 12, 1888.
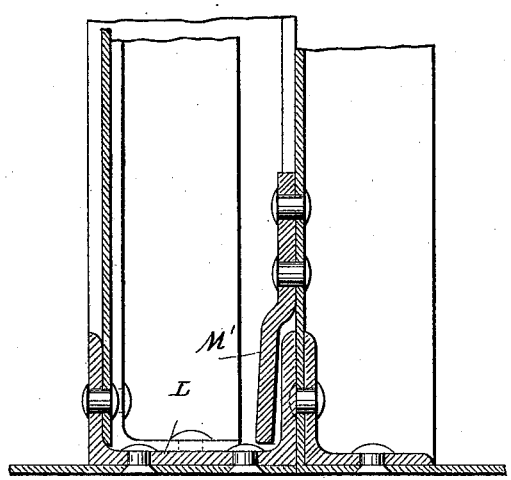
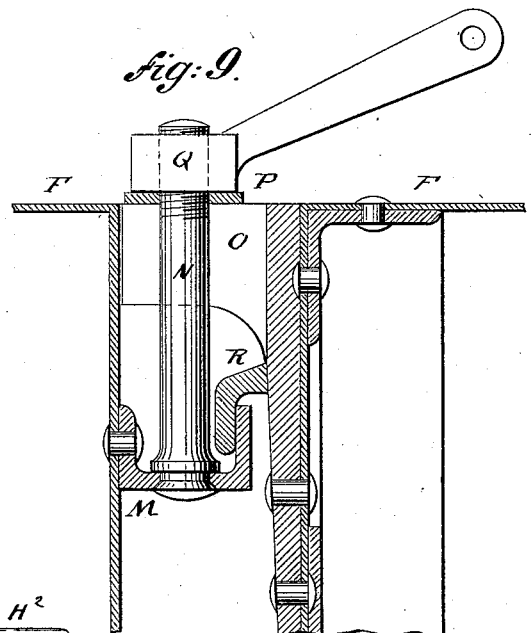
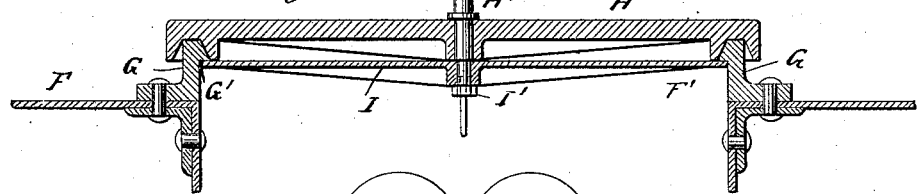
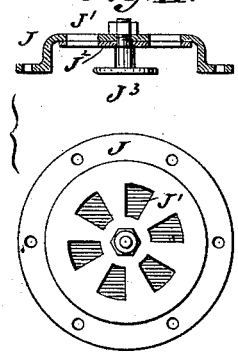
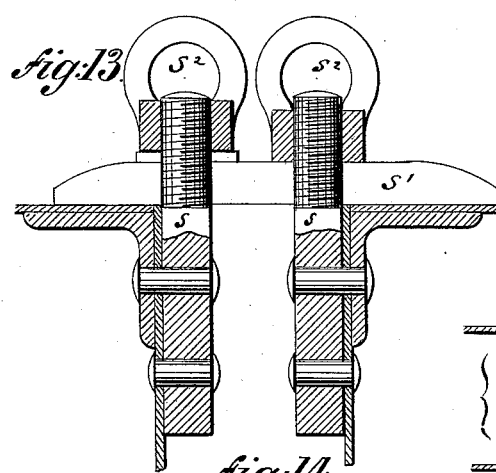
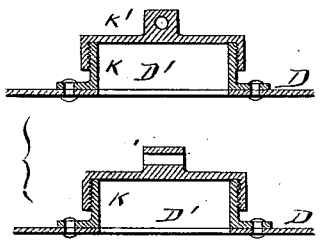
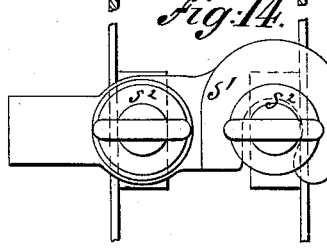
WITNESSES:
A. Schehl.
Carl Karg.
INVENTOR.
Simon J. E. Jörgensen
BY
Goepel & Raegener
ATTORNEYS.

UNITED STATES PATENT OFFICE.

SIMON JACOB ENGELHARDT JÖRGENSEN, OF LAUGET, NEAR RISOE, NORWAY.

COMBINED WATER-TANK AND LIFE-BOAT.

SPECIFICATION forming part of Letters Patent No. 384,579, dated June 12, 1888.

Application filed February 29, 1888. Serial No. 265,742. (No model.) Patented in England February 15, 1886, No. 2,200.

*To all whom it may concern:*

Be it known that I, SIMON JACOB ENGELHARDT JÖRGENSEN, of Lauget, near Risoe, in the Kingdom of Norway, have invented certain new and useful Improvements in a Combined Water-Tank and Life-Boat, (which has been patented to me in Great Britain under date February 15, 1886, No. 2,200,) of which the following is a specification.

This invention relates to certain new and useful improvements in the construction of water-tanks for marine vessels, whereby said water-tanks can be readily united and converted into a life-boat which is safe, staunch, and reliable.

The invention consists in water-tanks having a bottom water-tight compartment, which tanks can be united to form a life-boat, said lower compartments forming the lower part of the hull of said life-boat.

The invention further consists in the combination, with the tanks, of fastening devices for uniting them.

The invention further consists in the special construction of a truck or carriage on which the tanks rest and by means of which they can be transported very rapidly and raised slightly to facilitate uniting them.

The invention also consists in the construction and combination of parts and details, as will be fully described and set forth hereinafter, and then pointed out in the claims.

In the accompanying drawings, Figure 1 is a longitudinal sectional elevation of an improved life-boat composed of six of my improved water-tanks. Fig. 2 is a plan of the same. Fig. 3 is a cross-sectional elevation of one of the tanks. Fig. 4 is an end view of the same. Fig. 5 is a cross-sectional view of one of the carriages and an end view of a tank thereon, parts being broken out. Fig. 5$^a$ is a side view of one of the cams on an axle of the carriage, the axle being shown in section. Fig. 5$^b$ is a side view of one of the levers on the axle of a carriage, parts being broken off. Fig. 6 is a plan view of one of the carriages, the levers on the ends of the axles being omitted. Fig. 7 is a side view of one of the bars for uniting the two axles of the carriage. Fig. 8 is a detail cross-sectional elevation of those parts arranged along the sides and bottom edges of the end of a tank for the purpose of holding two tanks together. Fig. 9 is a detail cross-sectional view of the uniting appliance at the tops of the tanks. Fig. 10 is a cross-sectional view of one of the hatches at the tops of the tanks. Fig. 11 shows a cross-sectional and top view of one of the ventilators in the hatches of the tanks. Fig. 12 shows two cross-sectional views at right angles to each other of the hand-hole covers in the false bottoms of the tanks. Fig. 13 is a cross-sectional view of a modified construction of the device for uniting the tanks at the top. Fig. 14 is a top view of the construction shown in Fig. 13.

Similar letters of reference indicate corresponding parts.

As shown in Fig. 1, the life-boat is composed of six tanks, Nos. 1, 2, 3, 4, 5, and 6, which gradually vary in width, the tanks forming the bow and stern parts of the boat being tapered, as shown. On the rear tank the rudder B is hinged, and the third tank from the front is provided with an inclined pocket or receptacle, C, for the lower end of the mast. The tanks also vary in height, so that the depth of the boat formed by the tanks will be greatest at the ends and least at the middle, as clearly shown in Fig. 1. The tops of the tanks are made flat transversely, the sides are inclined downward and toward each other, and the bottoms are made flat, as appears in Figs. 3 and 4. Each tank is provided at some distance from the bottom with a false bottom, D, dividing the tank into the upper compartment, A', and the lower compartment, A$^2$. Angle-irons $d$ extend along the top, sides, and bottom of the lower compartments, A$^2$, transversely to the length of the tank, and like angle-irons $d'$ extend along the top and bottom of the sides of the lower compartments longitudinally. Angle-irons $d^2$ extend along the sides and top of the upper compartments, A', transversely to the length of the tank. Angle-irons $d^3$ extend longitudinally along the top of the upper compartments, A'.

To the under side of the bottom of the tank the two T-irons E E are secured longitudinally, which form the keels. Said keels may be made of U-irons or of angle-irons, and sections of the keel may be secured to each tank or to central tanks only; but are then to be of such length as to extend under the other tanks also. In the top F of each tank an opening, F', is formed, along the edges of which upwardly-projecting angle-irons G are secured, said angle-irons being provided with an internal shoulder, G'. The hatch H has a grooved rib on the under side along the edge for the purpose of receiving the top edge of the angle-iron G, and is also provided with a central opening, through which a spindle, H', passes, having a hand-wheel, H², secured on its upper end, said spindle also passing through a central aperture of a plate, I, below the hatch H, the edges of said plate I resting against the shoulder G'. A nut, I', is screwed on the lower end of the spindle H and rests against a central boss of the plate I. On the inside the upper part of the angle-iron G is beveled inward and downward, and the groove in the rib of the under side of the hatch H is beveled correspondingly, so as to form a close and tight joint. Each hatch H is provided with an aperture, over which a raised frame, J, is secured, having a series of apertures, J', which can register with corresponding apertures in a plate, J², resting against the under side of the central portion of the frame J, which plate J² can be turned by means of a hand-wheel, J³, formed on a spindle secured to the plate J². The frame J and the apertured plate mounted to turn on the under side of the same form a ventilator, which can be adjusted from the inside of the tank. The false bottom D of each tank is provided with an aperture, D', along the edges of which a neck, K, projects upward, this neck being screw-threaded externally, so as to permit of screwing on it a cap, K', provided with an apertured boss for receiving an implement or key for turning the cap.

To one end of each tank a U iron, L, is riveted on the outside, said U-iron extending along the sides and bottom of the tank, as shown in Fig. 4. To the opposite end of each tank a clip-plate, M', is riveted, which also extends along the sides and bottom of the tank, said clip-plate being adapted to pass within the U-iron and to rest against one shank of the same, as shown in Fig. 8. As shown in Fig. 8, the sides of the tanks extend beyond the end plates a distance equal to the width of the U-iron, so that when the tanks are united the edges of the side plates abut. Between the upper ends of the shanks of the U-irons L, secured to the end of a tank, a transverse U-iron, M, is riveted to the end of the tanks, and from the same a series of bolts, N, project upward. On the opposite end of the tank a series of lugs, O, project, between which the bolts N can pass upward, and on said lugs a plate, P, is passed, also having apertures, through which the bolts N can pass. Nuts Q, having suitable handles, can be screwed on the upper ends of the bolts N. A transverse downwardly-projecting clip, R, is formed a short distance below the upper edge on that end of each tank opposite the one on which the U-iron is secured, the clip R of the one tank being adapted to pass into the recess of the U-iron M of the adjacent tank, as shown in Fig. 9.

In place of the fastening devices (shown in Fig. 9) at the tops of the tanks, a series of bolts, S, may be riveted to each end of the tank at the top, said bolts projecting upward, hooks S', placed on the top of the two adjacent tanks, one bolt, S, passing through an aperture of a hook and the other passing through the recess or notch of the hook. Nuts S² are then screwed on the upper ends of said bolts, as shown in Figs. 1, 3, and 4. Each tank is provided with an outlet-cock, T, or equivalent device for drawing the water from the upper compartment, A'. Stanchions U project upward from the sides of the tank at the top and serve to form a bulwark, or may be used as oar-locks. Each tank rests upon an axle, W, having a wheel, W', on each end, said axles being united by bars U', having notches U² for receiving the axles, which bars are united and braced by braces U³. On each end of each axle W a handle-lever, V, is fixed for turning the axles. On each axle two cams, Y, are rigidly mounted for the purpose of raising the tanks off the axles. The carriages formed by the axles and frames just described are placed in any convenient part of the deck of the vessel, and the tanks rest on the carriages. The tanks are filled with fresh water, which can be drawn when required. In case of an accident, when the tanks must be converted into a life-boat, the valves or cocks T are opened so as to permit the water to flow out of the upper compartments, A', of the tanks as quickly as possible, the water remaining in the lower compartment, A². The carriages and tank-sections thereon are then wheeled to a proper place, where they are to be united, the tanks being placed end to end. Then the axles W are turned by means of the levers V, causing the tanks to be raised by the cams Y. The tanks are then moved toward each other and lowered, when the clips M' pass within the angle-irons L and the lips R into the angle-irons M, thus uniting the tanks very firmly against any longitudinal or lateral strain, but permitting them to move up and down in relation to each other. To avoid this up-and-down movement, the nuts Q are screwed tightly on the bolts N, whereby any vertical movement of the tanks in relation to each other is prevented. As stated, in place of the bolts N and nuts Q, the bolts S, hooks S', and nuts S² may be used. The hatches or covers H are removed and the necessary quantity of provisions, clothing, &c., placed into the several compartments formed by the tanks. In stormy weather the passengers can also pass into the compartments. The hatches H can be closed from the exterior or from the interior of the tanks. In case any water is to be drawn from the lower compartments, the covers K' are removed from the hand-holes. The ventilators in the hatches H can be opened at any time to permit fresh air to pass into the compartment formed by the tanks and the foul air to pass out. As the water always remains in the lower compartment, $A^2$, of the tanks, the life-boat is always provided with a sufficient quantity of fresh water, and said water also acts as a ballast and keeps the boat righted. The tanks distributed about the deck do not occupy much space, and six tanks, when united, form a life-boat that can accommodate from fifty to sixty persons.

Having thus described my invention, I claim as new and desire to secure by Letters Patent—

1. A life-boat formed of a series of separate sections locked together end to end, each section having two sides, two ends, and a top and bottom, substantially as set forth.

2. A life-boat composed of a series of independent sections locked together, each section having two sides, two ends, and a top and bottom, the sides and bottom projecting some distance beyond one of the end plates, substantially as set forth.

3. A ship's tank having a false bottom a short distance above the actual bottom, a hand-hole in said false bottom, and a cover for closing the hand-hole, substantially as set forth.

4. A ship's tank having a false bottom subdividing it in two compartments, and an outlet pipe or cock for the upper compartment, substantially as set forth.

5. A ship's tank having a U-iron secured along the sides and bottom at one end and a clip-plate along the sides and bottom of the opposite end, said clip being adapted to pass into the angle-iron on the end of an adjacent tank, substantially as set forth.

6. The combination of two ship's tanks, of a U-iron secured along the sides and bottom of the corresponding end of each tank, a clip-plate along the side and bottom of each tank at the opposite end, and bolts and nuts along the top edges of the tank, substantially as set forth.

7. The combination, with a ship's tank, of a U-iron secured along the sides and bottom at one end, a transverse U-iron secured on the same end a short distance below the top edge, a clip-plate secured along the sides and bottom of the opposite end, a transverse clip-plate secured on the same end a short distance below the top edge, and bolts and nuts at the top edge, substantially as set forth.

In testimony that I claim the foregoing as my invention I have signed my name in presence of two subscribing witnesses.

SIMON JACOB ENGELHARDT JÖRGENSEN.

Witnesses:
D. W. GREEN,
 *Cardiff*.
HENRY A. PINCOMBE,
 *Consular Clerk, Cardiff*.